(12) United States Patent
Samid

(10) Patent No.: US 11,539,519 B2
(45) Date of Patent: Dec. 27, 2022

(54) PRIVACY SOLUTIONS FOR CYBER SPACE

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 17/744,777

(22) Filed: May 16, 2022

(65) Prior Publication Data
US 2022/0278839 A1      Sep. 1, 2022

Related U.S. Application Data

(63) Continuation-in-part of application No. 17/510,324, filed on Oct. 25, 2021, now Pat. No. 11,336,447, and a continuation of application No. 17/001,163, filed on Aug. 24, 2020, now Pat. No. 10,965,460.

(60) Provisional application No. 63/306,501, filed on Feb. 4, 2022, provisional application No. 63/292,954, filed on Dec. 22, 2021, provisional application No. 63/276,662, filed on Nov. 8, 2021.

(51) Int. Cl.
*H04L 9/12*      (2006.01)
*H04L 9/40*      (2022.01)
*H04L 9/08*      (2006.01)

(52) U.S. Cl.
CPC .............. *H04L 9/12* (2013.01); *H04L 9/0891* (2013.01); *H04L 63/0407* (2013.01); *H04L 63/0471* (2013.01)

(58) Field of Classification Search
CPC ........................................................ H04L 9/12
See application file for complete search history.

(56) References Cited

U.S. PATENT DOCUMENTS

| | | | |
|---|---|---|---|
| 6,507,911 B1* | 1/2003 | Langford | G06F 21/78 713/193 |
| 2010/0318786 A1* | 12/2010 | Douceur | H04L 63/123 713/155 |
| 2017/0034167 A1* | 2/2017 | Figueira | H04L 63/061 |
| 2020/0015082 A1* | 1/2020 | Xie | H04W 52/281 |

* cited by examiner

*Primary Examiner* — Bradley W Holder

(57) ABSTRACT

Developing a cyber security protocol to enable two members of a community to conduct a conversation without revealing neither their identity, nor the fact that a conversation took place. Secret randomized matching is used to allow people to claim certain personal attributes like age, place of residence, having a license, but without exposing their individual identity.

10 Claims, 5 Drawing Sheets

PRIVACY SOLUTIONS FOR CYBER SPACE

This application is also a continuation in part of U.S. patent application Ser. No. 17/216,274 filed Mar. 29, 2021, and also continuation in parts of U.S. application Ser. No. 17/001,163 filed 2020 Aug. 24, and also a continuation in part of U.S. patent application Ser. No. 16/855,517 filed Apr. 22, 2020, which is a continuation of application Ser. No. 16/687,690, which is a continuation of application Ser. No. 16/444,892.

THIS DEFINES A CONTINUATION ZONE ENCOMPASSING THE CURRENT APPLICATION AND APPLICATIONS Ser. Nos. 17/510,324, 17/216,274, 17/001,163, 16/855,517, 16/687,690, 16/444,892, AND ALL THE PROVISIONAL APPLICATIONS REFERENCED IN application Ser. No. 16/444,892, CROSS REFERENCED HERE:

Provisional Application No. 62/688,387 filed on Jun. 22, 2018; Provisional Application No. 62/689,890 filed on Jun. 26, 2018; Provisional Application No. 62/714,735 filed on Aug. 5, 2018; Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018; Provisional Application No. 62/813,281 filed $4^{th}$ of March 2019; Provisional Application No. 62/850,720, filed May 21, 2019; Provisional Application No. 62/857,898 filed 6 Jun. 2019.

Provisional application 63/140,006 filed 2021 Jan. 21.

This application also claims the priority of the following provisional applications: No. 63/306,501 filed 2022 Feb. 4, No. 63/292,954 filed 2021 Dec. 22, No. 63/276,662, 2021 Nov. 8

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Security begins with privacy. Alas, ordinary privacy is under assault in cyber space, eavesdroppers, and data hunters peer into intimate communication and private conversations. While standard encryption hides contents of communication, it does reveal a lot about the communicators by tracking communication extent, frequency, volume, etc. It is time to develop tools to increase security in cyber space through better privacy tools.

BRIEF SUMMARY OF THE INVENTION

With the advent of digital money and its promise for payment privacy in cyber space, it is desirable to develop social interactions protocols, which can be paid for anonymously and practiced with adjustable privacy. Presenting two complementary protocols: (i) zero knowledge message exchange, (ii) measured privacy release. The first protocol allows two parties to be in a conversation without leaking the contents of their conversation, nor its pattern (frequency, extent), not even the fact that a conversation took place. This methodology is designed to restore the fundamental freedom of two parties to talk to each other without revealing even the fact that a conversation took place. The second protocol is designed to allow people to claim personal attributes, like age, education, license, etc. without revealing their identity. This is achieved through a series of regulated Trust Agents that replace identification parameters with a randomized bit string, and a given randomized bit string with a next randomized bit string, where the personal attributes are associated with the presenter of the randomized bit string and the personal attributes, so the recipient of the personal attributes is persuaded that the presenter is associated with the listed personal attributes despite remaining unidentified as a person. The two protocols may be integrated to enable two strangers to communicate without revealing their communication to others, and without revealing their identities to each other.

BRIEF DESCRIPTION OF THE DRAWINGS

FIG. #1: Untraceable Communication

The figure shows member i of a community preparing two messages: message $m_{ij}$ for member j and message $m_{ik}$ for member k. Each message is encrypted via a camouflage cipher. The respective ciphertexts, $m^*_{ij}$, $m^*_{ik}$ are surrounded by noise and uploaded to the public message depot, or message ledger, L. Member j and k of the community are each downloading the noise-wrapped messages. Member j discards all bits expect the bits of $m^*_{ij}$ and then decrypts it to the plaintext version $m_{ij}$, while member k discards all bits expect the bits of $m^*_{ik}$ and then decrypts it to the plaintext version $m_{ik}$.

FIG. #2: Privacy Chain of Trust

The figure shows a person P presenting his identity $I_p$ and a set of his personal attributes $A_0$, regarded together as $x_0$, to trust agency $TA_1$. $TA_1$ uses a random number generator, to create a string $x_1$ and keep a record to match $x_1$ with $x_0$. P presents his credentials, $I_p$ and $A_0$ to $TA_1$ by showing a card with his facial picture on it. $TA_1$ issues to P another card, showing his facial picture, but not displaying $I_p$, but indicating $A_1$ which is a subset of $A_0$.

Below the first submission as described above, the figure shows, person P submitting the card issued by $TA_1$ to $TA_2$. P also indicates to $TA_2$, that the output from $TA_2$ will list a set of P attributes, $A_2$, which is a subset of $A_1$. $TA_2$ issues a card representing P with a decoy name—not the real name, but with the true attributes of P. In this particular case the output card does not include a photograph of P face.

The part below the above shows person P uses the output from $TA_1$ when shopping at store S1. The stores can verify that the customer before them has attributes $A_1$. Store S1 can verify that the submitter of the card with $X_1$ is its owner by comparing the picture on the submitted card to the visible face of the submitting person. So store S1 is assured that the customer before them is associated with personal attributes $A_1$, without gaining knowledge as to the identity of P.

The lowest part in this figure shows P using the card showing $x_2$ while shopping in store S2. The stores may be assured that the person submitting the card is P on account of the fact that the data is signed by the private key of $TA_1$.

Figure 1:
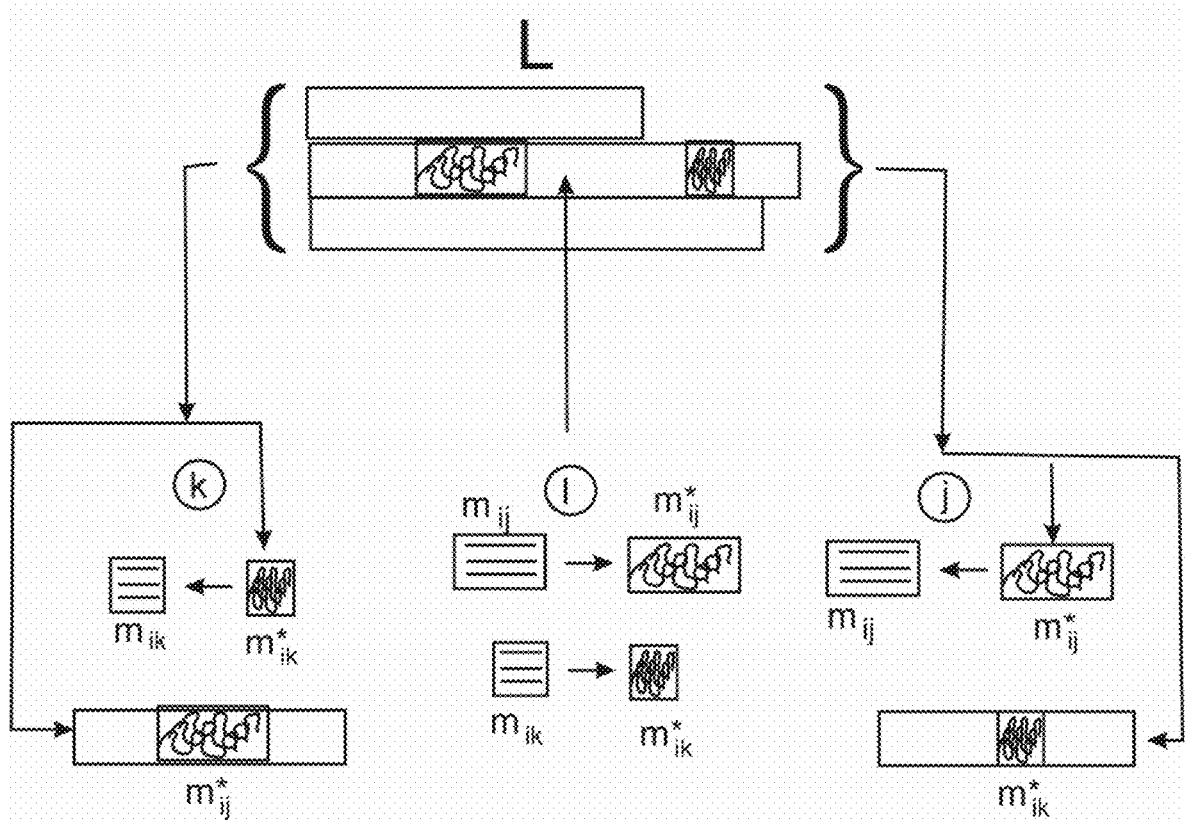
Figure 2:
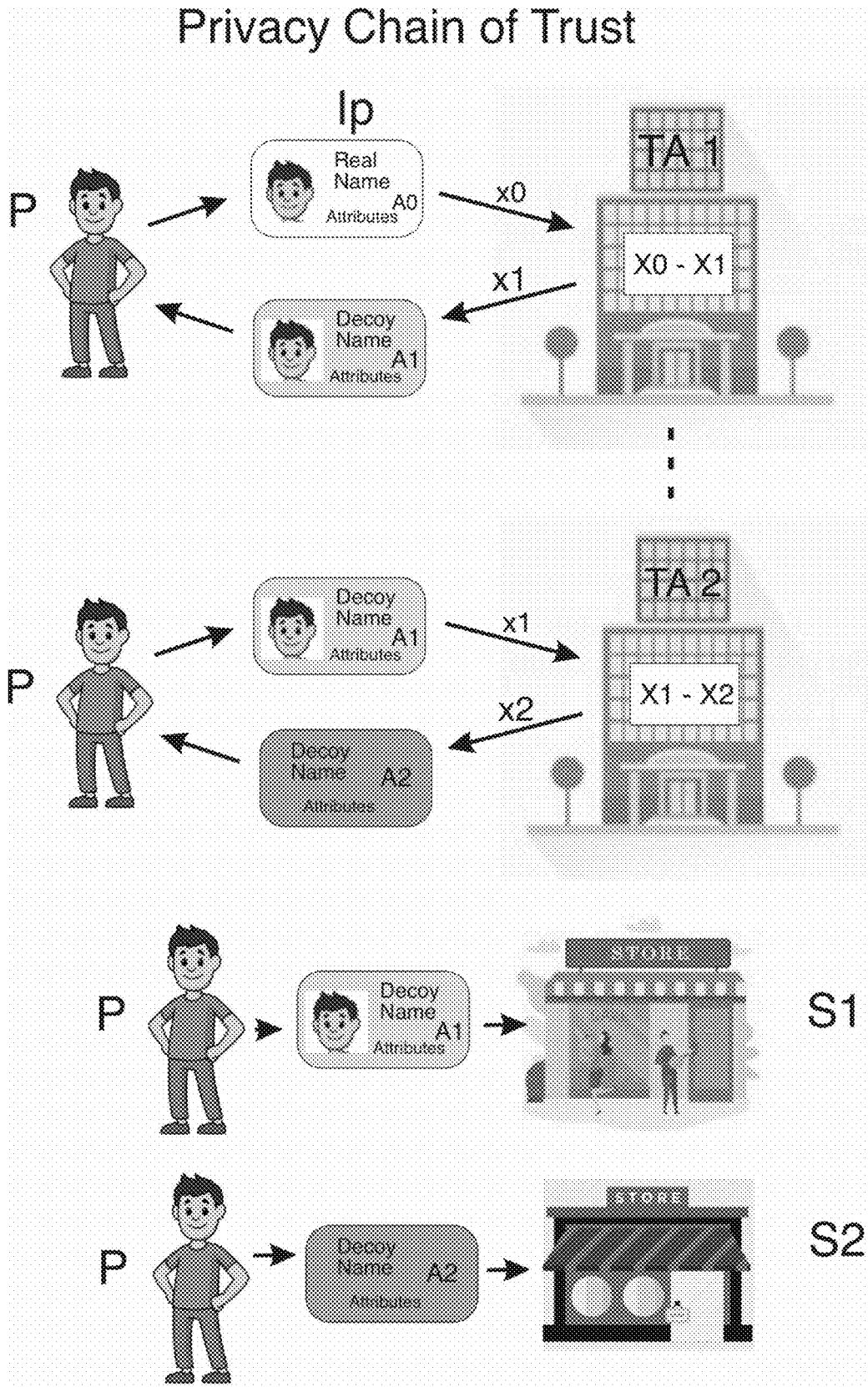
Figure 3:
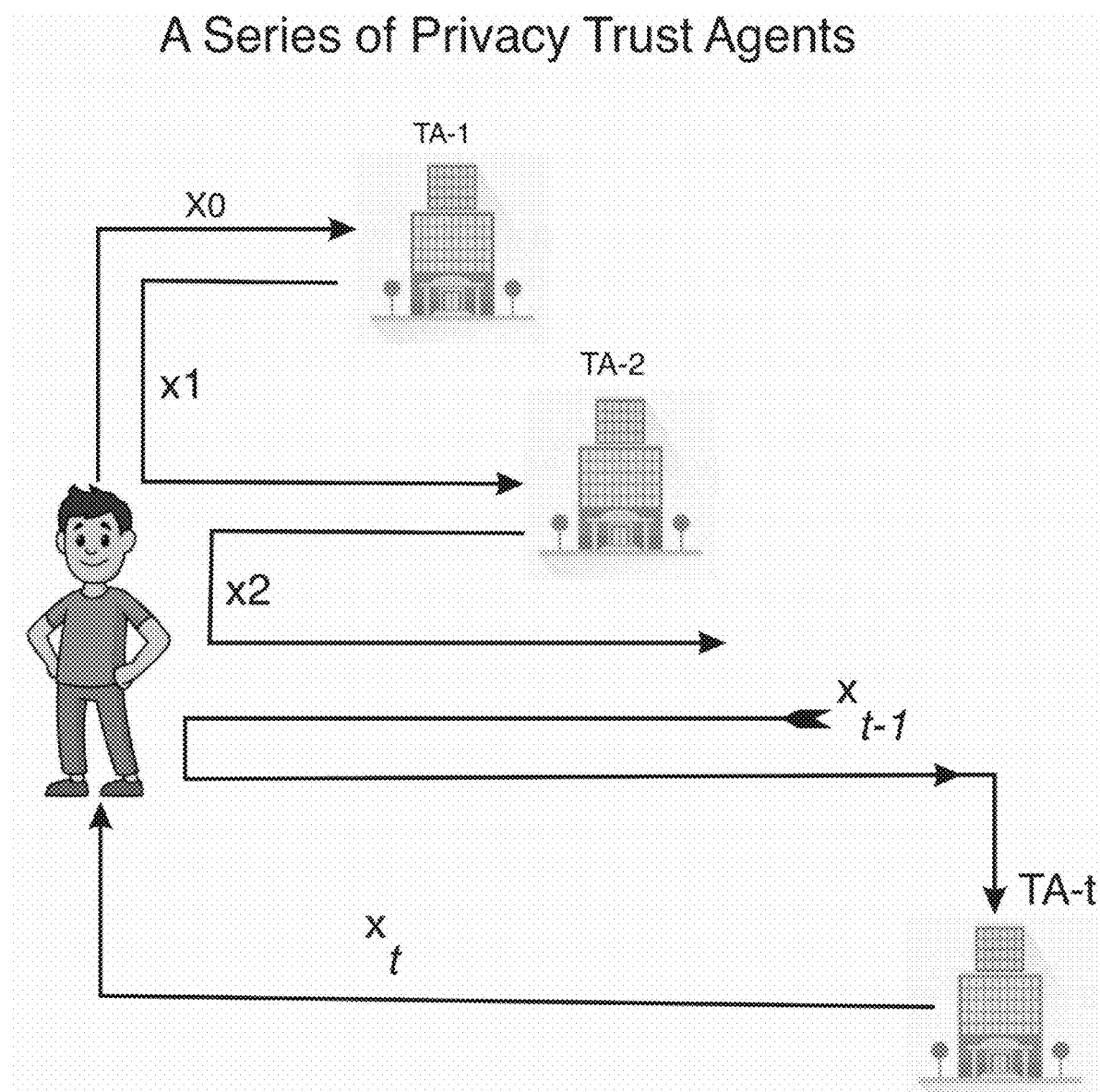

FIG. 3: A Series of Privacy Trust Agents

The figure shows a person P identified via a series of identification strings, $x_0$ $x_1$, . . . $x_t$, each issued by a corresponding trust agency.

Figure 4:
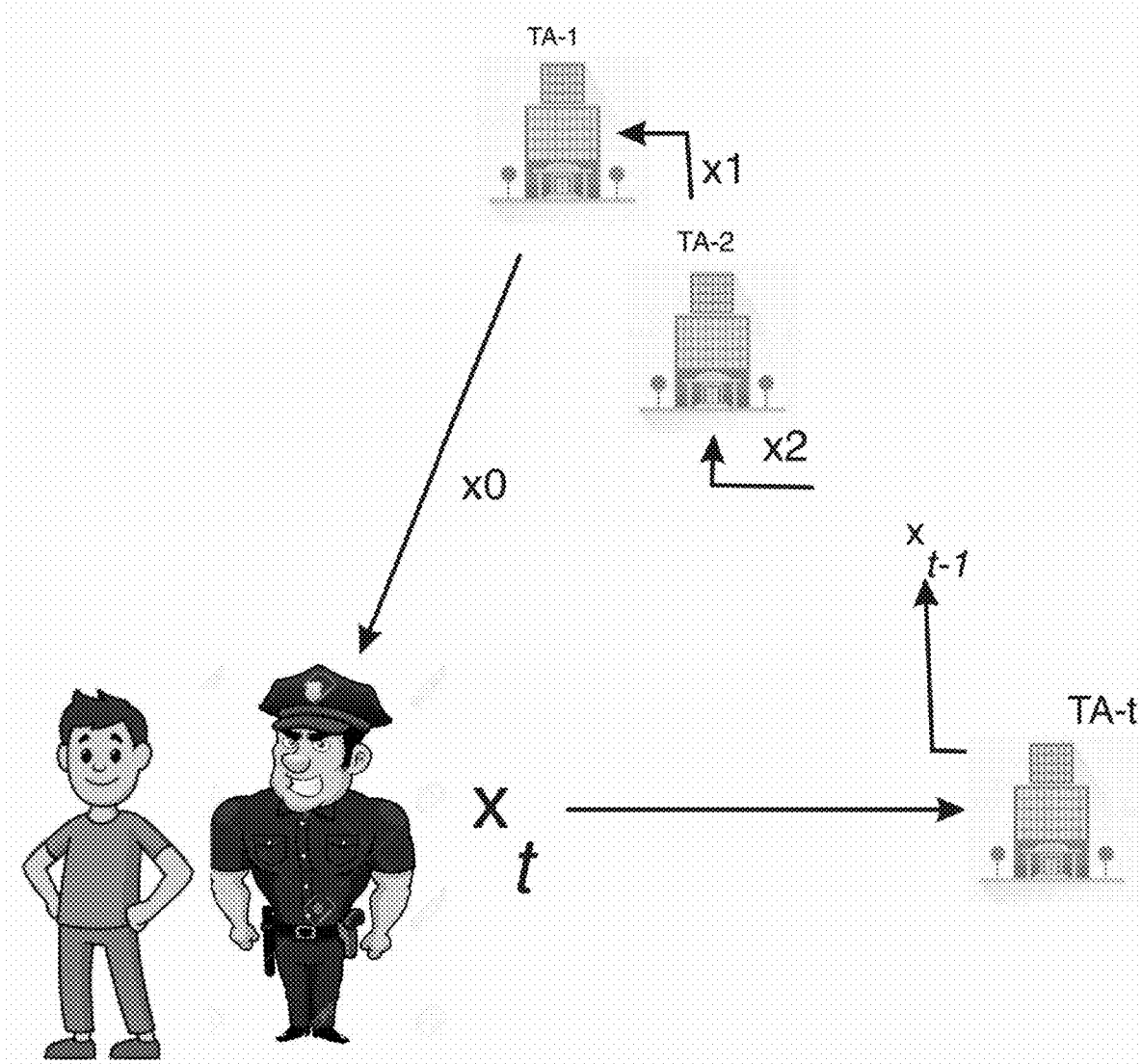

FIG. 4: Authorities Flash out Real Identity

The figure shows how the authorities, starting with $x_t$, approach the series $TA_1, TA_2, \ldots TA_t$ in reverse order, until they flash out the real identity of the person identifying himself through $x_t$.

Figure 5:
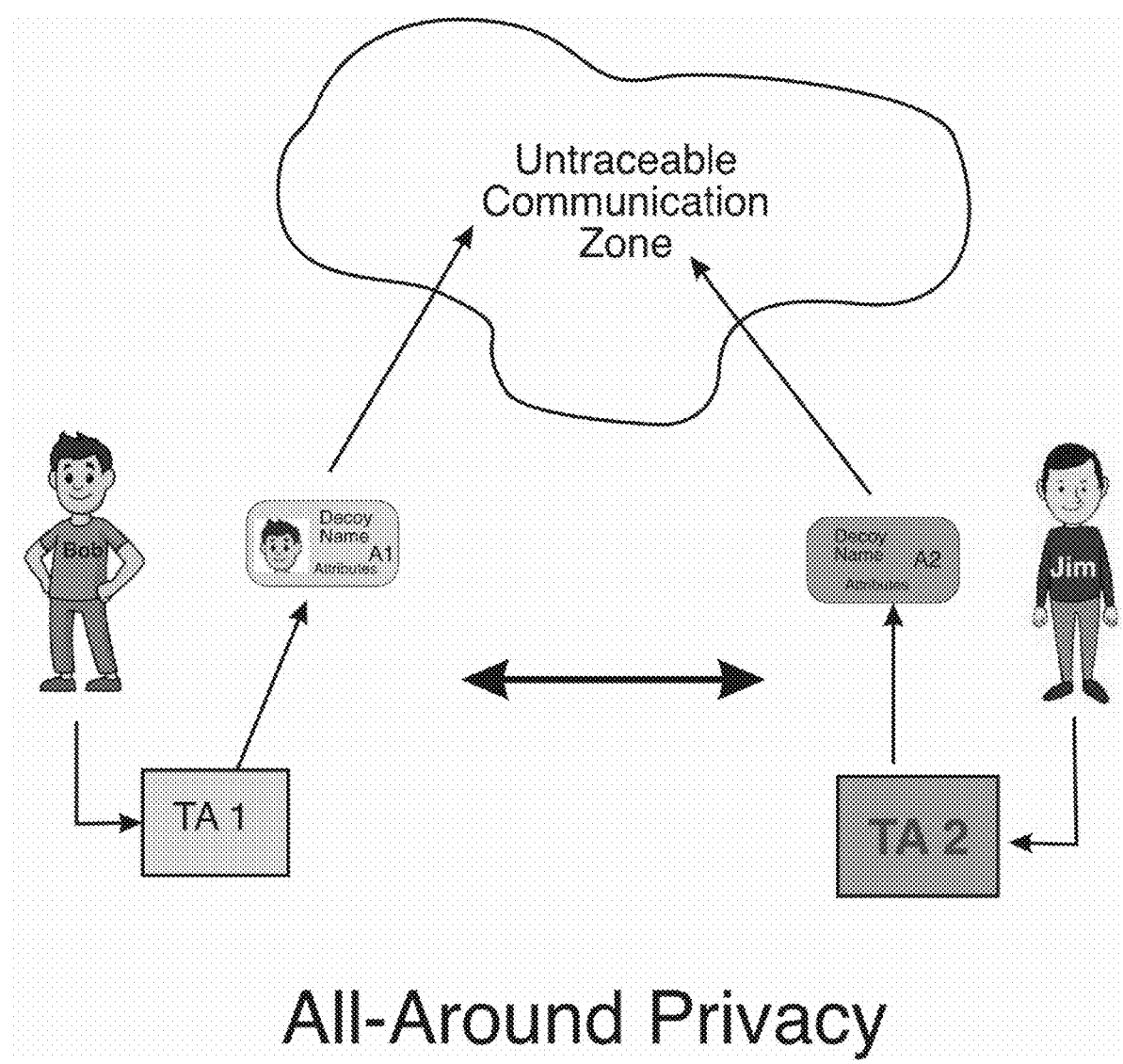

FIG. 5: All Around Privacy

This figure shows two strangers, Bob and Jim, each using a trust agency to create a decoy identity. They present themselves to each other through their decoy identity, so they hide their true identity from each other. Each uses the decoy identity to become a communicator in an untraceable communication zone. Thereby Bob and Jim can hide their true identity from each other, and can further hide their communication from anyone else in their community. By conversing through the privacy communication protocol they remain unexposed as to the pattern of their conversation even as to the fact that communication took place.

DETAILED DESCRIPTION OF THE INVENTION

1.0 Untraceable Communication

This methodology is built upon the zero-knowledge methodology described in the continued application Ser. No. 16/687,690 in which n parties established a communication dynamics that hides the pattern of communication among those n participants. The solution called for an ongoing ring-configuration information flow. This flow regimen is fitting for elements of a cohesive entity united by a shared mission. We now extend this methodology to n participants that have nothing or very little in common, yet they share their aggregation into a group in order to construct a communication protocol that establishes their privacy with respect to content, mode of communication and even with regard to the fact that participant i communicated with participant j, where i,j=1, 2, . . . n.

1.1 Introduction to Untraceable Communication

We consider a community C of individuals and entities. Community member i may wish to communicate to community member j without leaving a trace of this communication.

If member i (or node i) uses the public information highway to send message $m_{ij}$ to node j, then network surfers may intercept the message and violate the i-j privacy. Node i, can therefore encrypt the message into $m^*_{ij}$ and thereby protect its content. Yet the fact that a message of the given size was sent at the given time from member i to member j remains in the open.

Node i can use a camouflaged cipher, like BitFlip (U.S. Pat. Nos. 10,728,028, 10,541,808) which generates a ciphertext that includes noise, or non-message bits, such that the intended recipient will readily wash out the noise and remain with the message-bearing bits to be decrypted to the original message.

Node i can send node j a fixed stream of bits per second. If there is no message passing from i to j then all these hits will be randomized and hear no information. If node i wishes to pass $m_{ij}$ to node j, then node i will encrypt the message to $m^*_{ij}$, and camouflage it in the fixed stream of noise bits. Node j will ignore the noise and decrypt the ciphertext $m^*_{ij}$, while an observer will not detect that a message was implanted in the randomized stream. (Assuming, like in most ciphers, $m^*_{ij}$ appears randomized).

This will protect the i-j communication not only from the contents of their message but also from knowledge about the pattern and attributes of the communication, including blindness as to whether a message was sent at all.

This solution will work for two parties, but it is impractical for a community C with a large number, c, of members. It is infeasible for 0.5c(c−1), of constant stream connection to be going on indefinitely (for any large enough c).

The public message board is a proposed solution for such a network.

1.2 The Untraceable Communication Protocol

Consider a message public ledger, L that takes in all messages sent from community members to each other. So message $m_{ij}$ sent from member i to member j, will not be sent directly i→j but will be uploaded by node i to L, and subsequently will be downloaded from L by member j.

Member i will encrypt $m_{ij}$ to $m^*_{ij}$ before uploading it to L.

If $m=m^*_{ij}$ is cataloged as such then any observer of L learns of the fact that m was sent from i to j. The observer may not be able to reverse $m^*_{ij}$ to $m_{ij}$, but will learn a lot from the existence and identification of $m^*_{ij}$ To remedy this exposure, one can arrange that all members of the community use a camouflaged cipher. Accordingly the various messages uploaded to L will list as one concatenated string M. Member j will download M, discard all its bits except the bits that represent $m^*_{ij}$ then decrypt $m^*_{ij} \to m_{ij}$.

Membr l will also download L, wash away all the bits from the download except the bits that represent message $m^*_{kl}$ to member l from member k. Thereby member l will read in L the message intended for it sent by member k.

We described here a situation where all c members of community C download the same public ledger L, and each, in their own private computing environment, discards all the L bits except those that represent a message for them. Because the clearing of L to the message bearing bits is done by each community member in their private computing environment, there is no exposure to an outside observer. Observers will see that all members of the community download L, but will not see which members found in L any message directed at them.

Observers might notice that member i sent up an encrypted message $m^*_{ij}$ to the ledger, but will not know who is the recipient and of course be blind to the content. Armed with this knowledge a power-exacting observer could approach member i and with credible threat for harm demand from member i to reveal to whom they communicated and what they said.

To meet such a threat member i will compose a message $m_{ik}$ to be sent to another community member k. Member i will encrypt $m_{ik} \to m^*_{ik}$, and add it to the upload. $m_{ik}$ is contrived to be plausible but not incriminating. Its purpose is to give member i a credible explanation for their uploading bits to the public ledger L, without having to disclose their message to community member j.

Member i will prepare the following upload, $L_i$, for ledger L:

$$L_i = [\text{noise}] - m^*_{ij} * [\text{noise}] - m^*_{ik} - [\text{noise}]$$

$L_i$ becoming part of the ledger L will be downloaded with the rest of the ledger by both member j and member k. Member k will strip $L_i$ to $m^*_{ik}$:

$$\text{Member } k: L_i \to m^*_{ik}$$

Member j will strip $L_i$ to $m^*_{ij}$:

Member $j$: $L_i \rightarrow m^*_{ij}$

Member i will accomplish their goal to send $m_{ij}$ to member j. Should member i be confronted by a threat projecting adversary demanding to expose their action in uploading $L_i$, then member i will point to $m^*_{ik}$ as the reason for the upload. The threatening agent may suspect that member i has sent another message to someone else, but will have no clue as to whether it is true; not who the recipient of the secret message is, and what is the content or the size of the suspected message. In other words, using this untraceable communication protocol (UCP), member i was able to send a secret message to member j without leaving any trace.

This Untraceable Communication Protocol works with symmetric cryptography. Two parties to the UCP will have a pre-shared key over a camouflaged cipher.

All this uploading, encrypting and decrypting happens in the computing devices of the community members—automatically. The human member i composes the message $m_{ij}$, and clicks to send it to member j. Message $m_{ik}$ can be handled in the procedure described above all without human intervention, or if so desired member i can compose $m_{ik}$ on their own.

1.2.1 The Public Message Ledger

The public ledger L will be put up by an untraceable communication protocol (UCP) service. Using any of the common ways to allow the public to upload data online, the UCP server will divide the growing ledger to time-stamped blocks:

$L = L^1 - L^2 - \ldots L^p$ where $L^i$ will be opened at time point $t_{i-1}$ and closed at time point $t_i$. When a block is old enough (flexible setting) the UCP server will remove it from the website.

The last (current) block will have only its opening time $t_{p-1}$, not $t_p$ because it is being filled now (members upload). When full it will be closed, at time point $t_p$ and block (p+1) will be opened.

Each member i of the community C will be checking the ledger at some desired interval of time. When member i checks the ledger it remembers time point $t'_i$ when it checked the ledger last, and then downloads only the blocks it did not inspect before.

The UCP server may charge any uploader for the service.

This way every member i of community C is assured they see the entire contents of the ledger.

1.2.2 Insuring Clean Wash of the Ledger

This untraceable communication protocol (UCP) depends on the ability of each recipient j to 'wash' a block of the ledger, $L^p$ to the message $m^*_{ij}$ sent from member i to member j. This washing action depends on the selected cipher.

We discuss how to ensure such a wash with BitFlip (U.S. Pat. Nos. 10,728,028, 10,541,808). The risk with BitFlip is that inadvertently two letters will be the same, making the wash erroneous. This can be prevented by allocating to all members of the community a unique identifier, f, and then a pair of community members i and j will agree on an alphabet for practicing the BitFlip cipher, and then add to each letter the unique identifier (concatenated) thereby ensuring that no two letters will be the same. To be sure i can send the message to j twice, thereby reducing the chance for confusion to any small, desired measure. Also, different keys will be based on different size letters, further reducing any chance for confusion. The size of the letter can be specified in the header of the message:

$L_i$=[header]-[contents]

where the header is comprised:
header: message id-cipher id-key attributes-message length-trailer size
and the trailer is comprised
trailer: error correcting signature of the message
For BitFlip cipher the letters will be identified per their bit length.

Multi-Lateral Communication

The description above focused on bilateral communication but it can readily be extended to multilateral communication. Some b members of the community will share a secret cipher key so that each member of the b size group will be able to write messages to be secretly read by the other (b−1) members.

2.0 Privacy Chain of Trust

In a typical social interaction, one is called to demonstrate personal attributes, like age, city of residence, education, a variety of licenses, etc. Normally exposure of such personal attributes involve personal identification, and hence loss of privacy. What is desired is to allow individuals to demonstrate certain personal attributes without identifying their personal identity. Presenting a method for doing so both in cyber space and in the physical space.

The method is based on building a chain of trust through threaded trust agents. The chain starts with an identifiable individual, and ends with a so called decoy version of that individual. The people who deal with the decoy don't know the identity of the person they are dealing with but they are assured by the chain of trust that this decoy represents an identifiable individual, which can be flushed out if so ordered by a competent court of law.

2.1 Introduction to Privacy Chain of Trust

We consider a person P associated with n personal attributes $a_1, a_2, \ldots a_n$. P seeks a social transaction T with an entity Q. The nature of T is such that P needs to prove to P that a certain personal attribute a, is compliant with a condition C=C(Q,T). P wishes to supply this proof without exposing their identity $I_p$.

Example: P wishes to join into an online class or presentation which is limited to people 18 years or older. P is 25 years old and qualifies. P then wishes to prove to Q their qualifications without exposing $I_p$.

Many social transactions S involve payment. Given the increased prevalence of digital money which enables one to pay digital coins without identifying the payor, then the range of S transactions for which this desire to maintain privacy is arising becomes very large.

Example: A show offers discounts for residents of a given local. P lives in the designated local, they wish to pay anonymously and enjoy the discount by proving their place of residence without revealing their full identity.

We assume that in the case where P is prepared to expose their identity, then P has the means to prove that an arbitrary personal attribute $a_i(P)$ is compliant with some arbitrary condition C.

Example: one proves age with a driving license or a passport, one proves education with a diploma, and a license with a license document. etc.

Presenting a solution to this challenge, Measured Privacy Release (MPR): Chain of Trust.

2.1.1 Chain of Trust, the Principle

Let $TA_1, TA_2, \ldots TA_t$ be t trusted social entities. Let each $TA_i$ (i=1, 2, ... t) functions as follows:

$$x_{i-1} \to [TA_i] \to x_i = x'_{i-1}$$

where $x_{i-1}$ and $x'_{i-1}$ are data elements, and where the connection between input data, x, and output data x' is fully randomized. Namely given x, the chance for an observer to guess x' is 1/r', where r' is the number of values that x' may assume. And similarly, given x' (the output data), the chance for an observer to guess x is 1/r, where r is the number of values that x may assume.

The bijection x-x' is kept by trusted agent, TA, or more specifically the bijection $x_i$-$x'_i$ is kept by $TA_i$ in confidence. And as indicated this bijection is randomized to keep the guessing attack at minimum.

Accordingly, one could construct a chain of trust as follows:

$$x_0 \to [TA_1] \to x_1 \to [TA_1] \to x_2 \to \ldots x_{t-1} \to [TA_t] \to x_t$$

The person P represented by $x_0$, which exposes the full identity of P ($I_p$) will come out at the end of the chain of trust as a 'decoy' for P, represented as $x_t$. $x_0$ is the data string that carries the personal data, the personal attributes that identify the represented person P in complete confidence. $x_1, x_2,$ and on are regarded as 'decoy strings'. By themselves they don't identify P. However $x_1$ for i=1, 2, ... will identify P by backing up these decoys to $x_0$.

Given $x_t$ one will have to compromise all the t Trusted entities $TA_1, TA_2, \ldots TA_t$ in order to extract $x_0$.

We consider an individual person, P identified through a body of data $I = I_p$. P has n attributes:

$$A = \{a_1, a_2, \ldots a_n\}$$

Let $A = A_0$, and $A_i$ be a subset of $A_{i-1}$:

$$A_i \in A_{i-1}$$

for i=1, 2, ... t where $A_i$ is a collection of some attributes from A

We also denote as $AP_i$ as the set of attributes $A_i$ associated with person P.

Let $H = H_0 = I$. And let $H_1$ be a data element set up to hide the identity I. That is the identity of $H_1$ is randomly selected per a given $I = H_0$. Generally we define $H_i$ as a data element designed to set up to hide the identity of $H_{i-1}$ for i=1, 2, ... t. This hiding occurs by randomized matching of $H_{i-1}$ and $H_i$. The matching is recorded in the trusted agent $TA_i$ database.

We define $x_0 = \{I = H_0, AP_0\}$
We define $x_1 = \{H_1, AP_1\}$
and in general: $x_i = \{H_i, AP_i\}$ In summary an individual person P with identity $I_p$ and attributes A will be represented by a body of data $x_i = \{H_i, AP_i\}$. $AP_i$ is a plain data element that carries the values of the attributes as they are measured for individual person P, comprising the attributes that belong to group $A_i$. $AP_i$ can be backed up to $AP_{i-1}$, and so on to $AP_0$, as registered by the corresponding trust agents.

So Ai is the set name of the attributes in this set (subset of A) and APi is the data element that represents the values of these attributes as measured over individual P.

The individual person P will use $x_i$ to represent themselves before an entity Q, claiming that while Q is blind as to the identity of person P by the hiding data element $H_i$, Q nonetheless knows that a person P does exist, and claims properties $A_i$ with the values indicated in $AP_i$. If the activity scheduled between P and Q is hinged on P having properties $A_i$ in compliance with some set of rules, then Q is satisfied by $x_i$ that these rules are adhered to, despite the fact that Q is not aware of the identity of P.

While Q will not know identity of P, $H_i$ will satisfy Q that there is a person P that was identified by a mutually trusted trust agency (or trust agent). This trust agency issued $H_i$ which comprises an identity of the issuer trust agency and a cryptographic signature to satisfy Q that Hi is bona fide.

This trust of Q in $x_i$ is based on the societal trust in the integrity of the t trusted agencies: $TA_1, TA_2, \ldots TA_t$.

In the event that P is charged by Q, then P can pay with a digital coin without exposing their identity.

In order for Q to expose the identity of P, Q will have to request $TA_t$ to release $H_{t-1}$, given $H_t$, and if satisfied, then to release $H_{t-2}$ given $H_{t-1}$, and so on until $I = H_0$ is exposed to Q.

The n trust agencies are set up such that they protect the identity of their customers against any query from Q or others, while they honor a court-ordered demand for the same.

By setting the t trust agents $TA_1, TA_2, \ldots TA_t$ to be government regulated one ensures both high security against unauthorized breach of the t input-output association databases in the trust agencies, and ensuring a full cooperation with a court order demanding the same.

2.2 Privacy Chain of Trust (PCT)

Given a community C comprised of individual persons $P_1, P_2, \ldots P_e$ and q social entities $Q_1, Q_2, \ldots Q_q$, the community C will invite t entrepreneurs to each set up set up a trust agency: $TA_1, TA_2, \ldots TA_t$ that would be subject to community regulatory control. Each trust agency, $TA_j$ will create a secret association $x_{i-1}, x_i$. for some $P_i$ so requesting. Some of the t trust agencies will be equipped to serve as the first in the chain agency, $TA_1$. The first in a chain agency will comply with regulations to ensure that a person P approaching it will be properly identified as the one with a personal identity $I_p$, and with attributes A, where $\{I_p, A\}$ that will be regarded as $x_0$. $x_0$ will carry with it the identity of the privacy generating agency $TA_1$. P, armed with $x_1$ will approach $TA_2$ to generate $x_2$ which will be a combination of $H_2$, and $A_2 \in A$, as well as the identity of $TA_2$. Person P will be able to keep mounting layers of privacy as they see fit, and perhaps reduce the list of attributes that is being carried forth. Each output package from a trust agency $TA_i$ will contain the hiding string $H_i$, the sub list of attributes $A_i \in A$, and the identity of $TA_i$.

We now further discuss:

1. Trust Agencies 2. Trust Queries 3. Trust Signatures 4. Trust Agencies Architecture

Trust Agencies

A Trust agency, TA, is an organizational unit, likely commercial. Its purpose is to establish a confidential link between input data x, and output data x': $x \to [TA] \to x'$. The person associated with x will be able to represent themselves as x' to some agency Q, and do so saying to Q: The x' representation connects the presenting person to a representation x, as documented in the input/output association database kept within the trust agency TA. So while Q does not know the x information, Q does know that x' is clearly connected to its associated x, and that connection is regulated by the prevailing authority which has the power to compel the trust agency, TA to reveal the value of x corresponding to x'.

The trust agency must be (i) web accessible, (ii) running a secure effective database, (iii) resisting non-government exposure request, (iv) honoring properly executed formal government requests to release association data (x↔x').

Some trust agencies, regarded as Zero-Trust agency, $TA_0$ will further be equipped with means to validate identity of its human customers, and further validate the n attributes of each zero customer: $a_1, a_2, \ldots a_n$.

The zero Trust agencies will comply with rigorous regulations to ensure honest identification of individuals.

The Trust agencies will have to ensure that the output representation for the input data is randomly selected to gain maximum security. The input and the output data with respect to the trust agencies is comprising an identification string, either the exposed one ($H_0=I_p$), or a replacement string $H_1, H_2, \ldots$ followed by a list of all or some of the n attributes $a_0, a_1, \ldots a_n$. The values of the n properties remain unchanged between the input version and the output version.

The trust agencies will be expected to be quick and responsive. It should be ready to serve its prime customers who submit an input data, x, and expect an immediate turn over with data x'. The trust agency should be ready to respond to validation request, was the x' data submitted to some entity Q authentic? The biggest responsibility of the trust agency is to the security of its association (x-x') database.

Trust agencies will naturally be commercial enterprise, competing in the marketplace. They will charge setup fee for zero-Trust agencies validating identity, they will charge listing fee, to list an input data versus its corresponding output, and will charge maintenance fee for the time used. Time from listing to time of delisting.

The zero Trust agencies can be paid in ways which expose the payor because the payor is fully exposed anyway. Trust agencies $TA_1, TA_2, \ldots$ can be paid with privacy-preserving digital coins so that these agencies are not aware who is the person that uses their services. Trust agency $TA_i$ simply asserts with its output $x_i$, that it verified the data $x_{i-1}$, was issued by trust agency $TA_{i-1}$, and hence it enjoys the full trust commands by $TA_{i-1}$. And since the payment for the service of $TA_i$ was paid with privacy-preserving digital coin, $TA_i$ is clueless as to the identity of the person P whose privacy it guards.

The customers pick their choice for zero trust agency and their choice for subsequent agencies. They are the one who decide how many rounds of privacy t they wish to use. The more—the greater their security against hacking and corruption. It also becomes more expensive. A customer P can select $TA_i=TA_{i+k}$ for $k=2, 3, \ldots$ without $TA_{i+k}$ realizing it because $TA_{i+k} \neq TA_{i+k-1}$, and $TA_i \neq TA_{i+1}$. Many such loops are possible.

Discrete Email Address

Trust agent $TA_i$ will offer its client P an identity-hiding email address in the form:

{randomized name}@[$TA_i$ domain name].com.

This will allow P to establish a discrete line of communication with Q, and with $TA_i$. It can be used to pass along payment information etc.

Trust Queries

Trust queries are (i) to set up a x-x' line item, (ii) to validate x', (iii) to expose x-x' connection, (iv) to terminate an x-x' line item.

The first and the fourth ones are initiated by the customers of the trust agencies. The second is initiated by an entity Q approached by a person with their x' data, for which Q seeks validation. The third is initiated by a qualified authority presenting credentials for exposing the x-x' connection.

If a government agencies suspects some $x_i$ as being corrupt in some way, and convinces a judge about probable cause then they get a valid order to expose the person behind the hiding credentials. The government agency will approach trust agency $TA_i$ with $x'=x_i$, to extract $x_{i-1}$. This exposure will also identify $TA_{i-1}$ that generated $x_{i-1}$. The government agency will then approach $AT_{i-1}$ with the same authorized order and compel it to expose $x_{i-1}$ which was used as input to $TA_{i-1}$ for it to generate the output $x_{i-1}$.

This process of regression will continue $T_i, T_{i-1}, \ldots T_0$. $T_0$ will then surrender to the authorized government agency the personal data $I_p$ and attributes A of the person P that used the service of $TA_0$ to generate $x_0$ and start the sequence of hiding.

The regression process will be automated and fast.

Trust Signature

The transactional string, x, may be signed by the private key of the issuing trust agent:

$$x_i = TA_i\{H_i, A_i\}\Omega_i$$

where $\Omega_i$ is the signature of trust agent $TA_i$.

$TA_i$ will hash $\{H_i, A_i\} \rightarrow hsh_i$, then encrypt $hsh_i$ with $TA_i$ private key. $hsh_i \rightarrow \Omega_i$. Other protocols will do.

When P submits $x_i$ to transactional entity Q, then Q is checking that x integrity is in tact by verifying the signature $\Omega_i$ with the published public key for $TA_i$. Thereby Q is assured that the contents of x is genuine.

Trust Agencies Architecture

This privacy chain of trust solution is based on cascaded trust. $TA_i$ trusts that $TA_{i-1}$ has verified that the transactional string it took as input $s_{i-1}$ is unblemished and bonafide. Similarly $TA_{i-1}$ trusts $TA_{i-1}$, all the way to $TA_1$. All that trust is without basis. $TA_i$ knows the identity of $TA_{i-1}$, because it written in its transactional string $x_{i-1}$, but it is not aware of the identities of prior transactional strings.

Blindness extends forward too. $TA_i$ does not know the identity of $TA_{i+1}$, if any.

This chain of trust assumes that each trust agent trusts its former. This can be achieved in a closed community, where n trust agents $TA_1, TA_2, \ldots TA_n$ share a mutual environment, perhaps under the same jurisdiction.

We now consider a situation where the privacy chain of custody is being applied across social environments. That is we assume n trust agents $TA_1, TA_2, \ldots TA_n$ residing in one social environment while n' trust agents $TA'_1, TA'_2, \ldots TA'_{n'}$ reside in another environment. Trust agents don't know each other across social environments. In that case each social environment will designate a bridge over trust: $TA_b$ and $TA'_b$, which will establish trust one with the other and this pair will be used to build a chain of trust across the social environment.

A chain of trust from $TA_i$ to $TA'_j$ will look like:

$$TA_i - TA_{i+1} - \ldots TA_b - TA'_b - \ldots TA'_{j+1} - TA'_j$$

Use Cases

There are numerous use cases for the privacy chain of trust. An individual will be able to gauge and choose the length of the chain, namely to thread it from any desired number of trust agents $TA_1, TA_2, \ldots TA_t$. An individual would be able to protect themselves through any desired number of decoy personas. No one will know that decoy persona D and decoy personal D' are two different ends of a chains of trust, where the start of these chain is the same real person P. The only way to find out is to roll back the two chains. Presumably only the government can do so with the power of a court order.

The service of the PCT is of value to their users and hence a Trust Agent can charge for it. This will motivate several entrepreneurs to compete with each other for the benefit of the users.

Here are numerous use cases, here are a few:
1. Payment Privacy 2. Controlled consumer profile 3. Discrete counseling 4. Whistle blowing 5. Discrete Browsing 6. Network Participation (crypto currency).

Payment Privacy

Given the prevailing technology assuring payor-payee privacy one will be able to purchase merchandise and services, pay for them without exposing their identity, P, presenting themselves with a decoy identity D. Digital money technology can enable payment in which the payee is not aware of the identity of the payor. This payment procedure allows a person P to hide their identity for the variety of purposes listed below, yet, present themselves to the payee with a 'fake name' and a contrived identity to deal with.

Controlled Consumer Profile

Today online consumers surrender their consumption habits to a host of Internet data hunters who will build a personal consumption profile and use it to target advertisement and commercial allurement which has proven very effective. Many consumers welcome such profiling, but others are disturbed by it. The majority it seems would like some measured profiling which they control. And further would like the retain the power to clean the slate to make the profilers forget their personal data. The capability and technology described here will accomplish this.

A person P will represent themselves as decoy D and approach a vendor V with a subset of personal attributes $A_i$. The person P, will buy a set of merchandise $M_i$. This will provide the data hunters with information in the form of $D\{A_1, M_1\}$ which will be a basis for profiling P and suggesting certain merchandise in the form of target advertising.

P will control both $A_i$, and $M_i$, and also P can at any moment kill D, and stop any commercial activity as person D, and if an email is involved, then the email will go dad. This will allow P to make the data hunters retain useless data from their point of view, because the decoy identity D appears 'dead'.

So P, Mr John Doe, representing himself as D, "Jerry Next" identified per their shoe size and waste size and perhaps eyes prescription. P will then buy shoes, pants and eyeglasses, but not books and food. This will limit the data hunters to knowledge with respect to P that does not exceed what P wants V and the data hunters to know.

Discrete Counseling

Individuals seeking advice for an embarrassing situation are reluctant to identify themselves before the advice giver, fearing inadvertent or intended disclosure to the public or authorities. Using the Privacy Chain of Trust (PCT), one could describe the embarrassing situation in detail to the advice giver, pay for the services, and be secure against any hacking job onto the adviser computer, or against 'betrayal' by the adviser. More people will seek advice from therapists, lawyers, priests, etc.

Whistle Blowing

The PCT will readily serve whistleblowers, giving them a solid protection against unwanted disclosure, while giving the authorities the assurance that a real, eventually identified person is behind the whistleblowing allegation.

Discrete Browsing

An individual P could use d decoys $D_1, D_2, \ldots D_d$ to browse different URLs on the Internet, so as to protect their privacy. Say, using $D_1$ to look for books and movies, using $D_2$ to search for guns and ammunition, and use $D_3$, to browse for sexual partners. Thereby denying the data hunters the knowledge that all this browsing was done by the same person.

Network Participation (Crypto Currency)

A variety of computer networks rely on node count to establish power and authority. In a permission-less network, some bad actors can flood the network with a large number of unaccountable nodes and garner power from innocent nodes which each represents one person. This network vulnerability can be cured by insisting that nodes will be decoy identities that while they remain unknown to the network, the participants know that there is a real identifiable person behind each node, and a court order will expose them.

Security

In certain environments a suspicion may arise that a transactional string x may be copied by a different person $P' \neq P$, allowing P' to steal the privileges of P under the privacy chain of trust system.

We describe first a base solution for transactional string theft, and then an advanced solution for the same.

A Base Solution for Transactional String Theft

Together with $x_{i-1}$, P will forward to the trust agent $TA_i$ an identity proof data pack. Alternatively, the data pack will be offered by the trust agent.

The identity data pack will be constructed as follows: P will select any choice of a one-way algorithm $L_i$, and a pair of private and public keys $U_i$, $W_i$ respectively. Accordingly to compute $U_i \rightarrow W_i$ is easy but to compute $W_i \rightarrow U_i$ is intractable.

P will forward to $T_i$ the identity of $L_i$ and the value of $W_i$ as the identity data pack: $\{L_i, W_i\}$:

$$x^*_{i-1} = x_{i-1} - \{L_i, W_i\} = TA_{i-1}\{H_{i-1}, A_{i-2}\} - \{L_i, W_i\}$$

$T_i$ will issue its output string x* sign the security enhanced transactional string $x^*_i$ with $\Omega_i$:

$$x^*_i = x_i - \{L_i, W_i\} = TA_i\{H_i, A_{i-1}\}\{L_i, W_i\}\Omega_i$$

When P submits $x^*_i$ to Q, Q will check $x_i$ via the signature $\Omega_i$, and then request from P the value of $U_i$. Upon receipt of $U_i$, Q will compute $U_i \rightarrow W'_i$, using $L_i$. If $W_i = W'_i$, then Q is persuaded that the presenter of $x^*_i$ is indeed P because any $P' \neq P$ will not know the value of $U_i$.

The combination of L, U, W may be changed from one trust agent to the next or stay the same:

$$L_i = L_j; U_i = U_j; W_i = W_j$$

for i,j=1, 2, . . . t

An Advanced Solution to Transactional Identity Theft

The base solution calls for P to use a private key to demonstrate their identity. This leads to a situation where the private key was exposed to people in the engaging entity Q. Armed with the private key, U, anyone could use the transactional identity x as representing themselves.

To remedy this vulnerability the trust agency will issue not one but rather a large number, r, of pairs of public/private keys, all may be chosen over the same one-way algorithms. (alternatively, a different algorithm will be selected for every pair).

$$x_{*i-1} = x_{i-1} - L_i - \{W_{i1}, W_{i2}, \ldots W_{ir}\} =$$
$$T_{i-1}\{H_{i-1}, A_{i-2} = L_i - \{W_{i1}, W_{i2}, \ldots W_{ir}\}$$

The client, P, will keep secret the corresponding r private keys: $U_1, U_2, \ldots U_r$.

When Q is approached by P, Q will check the signed $x_i^*$ transactional string, then randomly select a public key $W_j$, and request P to forward the corresponding private key, $U_j$ (j=1, 2, . . . r). P will do so, allowing Q to verify that the computed $U_j \rightarrow W'_j = W_j$ as listed in $x^*_i$. If there is a match then Q concludes that the person presenting themselves as P is indeed who they say they are (in high enough likelihood).

One assumes a 'bad apple' in the Q organization who records $U_j$, and tries to use it in conjunction with $x^*_i$. When doing so against another engaging entity $Q' \neq Q$, there will be only a chance of 1/r for Q' to randomly select $W_j$ to be matched with a private key. By setting r high enough this chance can be made as low as desired. In other words, the would-be thief will fail the randomized private/public key test. When P uses $x^*_i$ g times, then the chance for a thief that may have collected all g values, to pass the randomized public-private key test is g/r. By setting the value of g and r as desired, this chance may be made as small as desired.

This advanced authenticity procedure may further be advanced through trust agent feedback.

Trust Agent Feedback

In this mode an engaging entity Q which is approached by someone pretending to be P and advancing $x^*_i$, yet failing the randomized public-private key test, will report back to the trust agent $TA_i$ of this event.

$TA_i$ will seek to contact P, alerting them on the attack and invite P to arrange a new transactional string.

This alerting action can readily be done via email. One implementation option calls for each trust agent, $TA_i$ to give P a $TA_i$ based email address: {randomized name|}@$TA_i$.com This email address will allow P to communicate with Q on the P-Q engagement, maintaining anonymity.

Privacy Preserving Identity Cards (PPId)

Driver licenses, Passports, assorted permits, and professional licenses normally specify a name and a personal number or code to specify that a particular individual is credited according to the contents of the physical document that says so. The Trusted Chain of Trust procedure will allow a society to issue Privacy Preserving Identity Cards, (PPId), which will be carried by individuals as a means of proof according to the contents of the card, but without a full exposure of the identity of the bearer of the card.

There are some instances where such a need arises. Individuals serving in sensitive positions may wish to conceal their identity, yet be able to prove to local authority that they have a license to carry a particular weapon, or some hazardous chemical, or any item for which a license is required. They would wish to do so without exposing their identity. The PPid will come in handy.

The PPid could be used, say, by hotel visitors, claiming special privileges on account of age, health or some non-visible disability. They will have a PPid that will prove that they have the claimed credentials, but will keep their ultimate individual identity concealed. There are numerous other cases.

A PPid may carry a photograph of its bearer so that an examiner will be convinced that the unidentified individual is the one who owns the PPid. Otherwise a bio-stamp like fingerprint, or an iris, or a palm may be used by the card bearer to prove their ownership of the card, without exposing their individual identity.

The PPid will identify the claimed credentials and specify the issued personalized identification tag and the identity of the trust agency that issued it. This tag and agency id will be inspected, and optionally be registered by the document examiner. This will be needed if for any reason at some future point there is a good reason to expose the specified individual identity of the carrier of the PPId. In that case the tag will be used by the authorities to recover from the issuing trust agency either the individual parameters of the individual to whom the PPId was issued, or another 'decoy' tag issued by another (the former) trust agency. In the latter case the authorities will regress through the chain of trust agents (agencies) and eventually recover from the first trust agency the identity of the subject individual. Thereby authorities will have a clear path to flash out any individual for which there is a substantial reason to expose their identity. Hackers though, will have to hack back the entire chain of trust agencies to expose the same individual.

If the identity of the bearer is specified with a finger print then the digital signature of the fingerprint will be recorded on the PPId, electronically or visibly. The individual claiming to be the right owner will be checked for finger prints on a special device operated by the card examiner. A data signature of the claiming individual will be generated by the measuring device, and be compared to the digital signature identified on the PPId. Same for other bio markers.

The validity of the card itself can be ascertained using the technology identified in U.S. patent application Ser. No. 17/372,482.

Operational Summary

This invention describes a method to enable members of a community C to exercise bilateral and multi-lateral communication without disclosing: (i) the content of any message, (ii) the pattern of communication between any two or more members of the community, and (iii) the fact that a certain member of the community communicated to a particular other member or members of the community; the method using a 'camouflage cipher' which is designed to discard meaningless bits in a bit flow that contains ciphertext bits for an intended reader, then decrypt only the ciphertext hits. There are several such ciphers that have the property of identifying irrelevant bits in a bit flow, removing them, and so extracting the ciphertext bits for decryption. E.g. BitFlip.

The method comprising the following steps with regard to two members of C, i and j who share a symmetric cipher key $k_{ij}$ applicable to a camouflage cipher, CC:

(a) member i of C, prepares a message $m_{ij}$ for member j of C (b) member i encrypts $m_{ij}$ to $m^*_{ij}$ using $k_{ij}$ (c) member i concatenates upfront noise $N_u$ and backside noise, $N_b$ to $m^*_{ij}$, "noise" being a string of randomized bits, creating a bit string $S_{ij}$:

$$S_{ij} = N_u - m^*_{ij} - N_b$$

With a cipher like BitFlip m*ij can be split to arbitrary parts:

$$M^*_{ij} = W1 - W2 - \ldots Wu$$

And some noise Nj can be injected between Wj and $W_{j+1}$, for j=1, 2, . . . u (d) member i submits $S_{ij}$ to an untraceable communication website (UCW), where it is added to other messages uploaded by other members of C (e) member j downloads the contents of UCW (periodically), and in the content it identifies the uploaded string $S_{ij}$ This identification may be based on headers and trailers, or by location on the website or some other way.

(f) member j removes $N_u$ and $N_b$ fro $S_{ij}$ (or any other noise as necessary).

(g) member j decrypts $m^*_{ij}$ using $k_{ij}$ and reads $m_{ij}$

This completes the basic procedure.

The above method can be further practiced where member i uses key $k_{ij}$ to encrypt message $m_{ij}$ to $m^*_{ij}$ for member j, who has a copy of $k_{ij}$, and also encrypt a different message $m_{ik}$ to $m^*_{ik}$ for member k of C using key $k_{ik}$, which is also held by member k;

the two encrypted messages $m^*_{ij}$, and $m^*_{ik}$ are concatenated with noise strings $N_1, N_2, N_3$ to construct a combined string $S_{ijk}$ as follows:

$$S_{ijk} = N_1 - m^*_{ij} - N_2 - m^*_{ik} - N_3$$

With some ciphers, like BitFlip, the two messages may be each divided to concatenated parts and mixed with each other and with randomized bits, as long as the order of the parts of each message is kept in tact.

Eventually member i uploads $S_{ijk}$ to the UCW;

member j downloads $S_{ijk}$ from UCW, discards all the bits except $m^*_{ij}$, then decrypts $m^*_{ij}$ to $m_{ij}$.

member k downloads $S_{ijk}$ from UCW, discards all the bits except $m^*_{ik}$, then decrypts $m^*_{ik}$ to $m_{ik}$.

This way each reader gets the message intended for them.

This invention further describes a method to establish a chain of trust agents (alternatively called trust agencies) that are used by individuals to claim personal attributes without revealing their identity; the method involves (i) an individual person, P, associated with n personal attributes: $A_0 = \{a_i, a_2, \ldots a_n\}$ (ii) a first trust-agent, $TA_1$, (iii) additional t−1 trust agents $TA_2, \ldots TA_t$, (iv) An entity Q for which P wishes to prove their association with attributes $a_1, a_2, \ldots a_i$, for i=1, 2, . . . n, without revealing their identity, $I_p$; Where Ip is a set of uniquely identifying parameters like name, social security number, and bio-factors.

The method proceeds through the following steps:

1'. P presents $I_p$ and A before $TA_1$

2'. $TA_1$ verifies P via $I_p$, and verifies A as associated with P;

3'. $TA_1$ activates a "Decoy Procedure" defined as follows:

3'.1 The activating trust agent, TA, defines an entry bit string, x, comprising $I_p$ and $A^*$: $x = \{I_p, A^*\}$ where $A^* = A$ or $A^* \in A$; $A^*$ is a partial or complete subset of A.

3'.2 The activating trust agent uses a random number generator, RNG, to build a corresponding exit hit string x':

$$x' = TA(x, RNG)$$

wherein the values of $A^*$ remains unchanged, but $I_p$ is replaced with a string $H_0$: $x' = \{H_0, A^*\}$ The values of A affect the value of x' but are left unchanged. Attribute ai is for P is a well defined attribute associated with a numeric measure.

3'.3 The activating trust agent, TA, keeps a record to document the match x↔x'. Thid record is added to TA1 database where many such input-output strings are kept and are secured against any hacking attempt.

3'.4 The activating trust agent, TA, transmits to the submitter of x the bit string x';

This defines the decoy procedure, which is applied by every engaged trust agent.

4'. P receives the output from the Decoy Procedure, $x'_0 = x_1$ from $TA_1$; where $x_0 = \{I_p, A\}$, and where $x_1 = \{H_1, A\}$, where $H_1$ is a randomized match for $I_p$;

5'. P selects an arbitrary subset $A_1$ of A, $A_1 \in A$, and modifies string $x_1$ as follows: $x_1 = \{H_1, A_1\}$;

6'. P submits $x_1$ to trust agent $TA_2$;

7'. Trust agent $TA_2$ activates the Decoy Procedure, and thereby generates output string $x_2$:

$$x_2 = TA_2(x_1, RNG)$$

and where:

$$x_2 = \{H_2, A_1\}$$

8'. for j=1, 2, . . . t:

8'.1 P modifies $x_j$ from $x_j = \{H_j, A_{j-1}\}$ to $x_j = \{H_j, A_j\}$ where $A_j \in A_{j-1}$;

8'.2 P submits $x_j$ to $TA_j$;

8'.3 $TA_j$ activates the Decoy procedure and generates $x'_j = x_{j-1} = \{H_j, A_{j-1}\}$;

9'. P submits $x_j$ to Q, for j=1, 2, . . . t;

10'. Q accepts that P is associated with the set of personal attributes $A_{j-1}$. It so accepts because it trust the former Trust Agent that generated the input string it is processing.

This method can be used wherein each attribute $a_i$ for i=1, 2, . . . n, in $A_j$ for j=1, 2, . . . t is individually signed together with $H_p$, and the set of these signatures, $\Omega_{j+1}$ is made part of the output string $x_{j+1}$:

$$x_{j+1} = \{H_{j+1}, I_j\} \Omega_{j+1}$$

where $\Omega_{j+1}$ is a set of signatures carried out with the private key of $TA_j$, and $x_{j+1}$ is verified via the corresponding public key of $TA_j$. The verification is carried out by $TA_{j+1}$ and by Q if P submits $x_{j+1}$ to Q. By signing each attribute individually, it becomes possible for P to remove any attribute from the string submitted to the next trust agent. Thereby P can control how much of his data be discloses to particular others.

The former procedure may be practiced where together with $x_{j-1}$, P forwards to trust agent $TA_j$ an identity proof data pack;

the identity proof data pack will be constructed as follows: P will select an arbitrary one-way algorithm $L_j$, and a pair of private and public keys $U_j$, $W_j$ respectively; wherein to compute $U_j \rightarrow W_j$ is easy but to compute $W_j \rightarrow U_j$ is intractable. Lj may be a hash function, an elliptic curve, or RSA type, or any of a multitude other candidates or a combination thereto.

P forwards to $TA_j$ the identity of $L_j$ and the value of $W_j$ as the identity proof data pack: $\{L_j, W_j\}$:

$$x^*_{j-1} = x_{j-1} - \{L_j, W_j\} = TA_{j-1}\{H_{j-1}, A_{j-2}\} - \{L_j, W_j\}$$

$TA_j$ will construct its output string $x_j = \{H_j, A_{j-1}\}\Omega_j - \{L_j, W_j\}$, sign $x^*_j$ with $\Omega^*_j$: $x^*_j = \{\{H_j, A_{j-1}\}\Omega_j - \{L_j, W_j\}\}\Omega^*_j$ where $\Omega_j$ is constructed with the private key of $TA_j$, and is verified with the corresponding public key;

P submits $x^*_j$ to Q, Q will check $x^*_j$ via the signature $\Omega_j$, and then request from P the value of $U_j$;

upon receipt of $U_j$, Q will compute $U_j \rightarrow W'_j$ using $L_j$. If $W_j = W'_j$, then Q is persuaded that the presenter of $x^*_j$ is indeed P;

the combination of L, U, W may be changed from one trust agent to the next or stay the same:

$$L_k = L_j; U_k = U_j; W_k = W_j$$

for k,j=1, 2, . . . t

The method above can be further evolved wherein P will construct the identity proof data pack by arbitrarily selecting an arbitrary number, r, of pairs of public/private keys, all may be chosen over the same one-way algorithm, $$X_{j-1} = x_{j-1} - L_j - \{W_{j1}, W_{j2}, \ldots W_{jr}\} = TA_{j-1}\{H_{j-1}, A_{j-2}\} - L_j - \{W_{j1}, W_{j2}, \ldots W_{jr}\}$$

or over different one-way algorithms:

$$X_{j-1} = x_{j-1} - L_j - \{W_{j1}, W_{j2}, L_{j2} \ldots W_{jr}, L_{jr}\} = TA_{j-1}\{H_{j-1}, A_{j-2}\} - L_j - \{W_{j1}, L_{j1}, W_{j2}, L_{j2}, \ldots W_{jr}, L_{jr}\}$$

P, will keep secret the corresponding r private keys: $U_1$, $U_2$, . . . $U_r$.

Q will randomly select a public key $W_k$, and request P to forward the corresponding private key, $U_k$ (k=1, 2, . . . r).

P will do so, then Q will verify that the computed $U_k \rightarrow W'_k = W_k$ as listed in $x^*_j$. If there is a match then Q concludes that the person presenting themselves as P is indeed who they say they are. This randomization will prevent anyone who knows a particular U value from using it to steal P identity without facing high odds for being caught in this act of fraud. The security of this method is higher for high r values.

The basic method described above may be further embodied where $x_j$ is written on a physical card, C, which also carries a data signature, P-bio, of biological attributes of P, and where Q measures the corresponding biological attributes of the person, P' who submit C to Q, then computes the respective data signature, P'-bio, then Q compares P-bio to P'-bio, if the comparison is affirmative then Q concludes that P'=P.

The latter method may be further specified where the biological attributes is one or more of the following: fingerprint, iris, palm structure. Or where the biological attributes is a facial photograph which is compared to the facial appearance of P'.

It is expected that the trust agencies will be regulated by the prevailing authorities such that upon a court-order each trust agency will reveal to the authorities the input data that is linked to any of its outputs. This will assure that regardless of how many trust agencies a person uses to conceal their true identity, if the circumstances warrant it, then the authorities will extract this identity without a doubt, relying on the obedience of the regulated trust agencies.

Integration of the Untraceable Communication with the Privacy Trust Chain

Combing the two protocols it is now possible for two strangers, persons P1 and person P2, to each use a decoy, D1 and D2 respectively such that the decoy data will reveal exactly what each person wants to reveal the other, and no more—this is through the privacy trust chain. These two strangers will then be able to communicate through the untraceable communication protocol without fear of being tracked by eavesdroppers—not the extent, not the frequency, not the volume of their conversation, not even the fact of the conversation taking place, will be exposed to any observer of the communication environment where P1 and P2 are conversing. In sum this method preserver bi-lateral privacy between the communicators, and preservers the privacy of their communication towards any other actors in the community.

Note: in this integration P1 will be the recipient of D2 (operate as "Q" in the protocol), and P2 will be the recipient of D1, also operating as "Q" in the protocol.

Illustration: two people who suffer from an embarrassing psychological disorder may reach out to each other, each using a decoy identity which nonetheless proves the existence of the disorder. They remain mutually anonymous, and can then practice the untraceable communication protocol and run a conversation that is not exposed to other members of the community. It is this all-directions privacy which gives these two people the courage and the openness to converse intimately and candidly and benefit from this deep level sharing.

Benefit: quite often people are reluctant to approach one another for fear of rejection and embarrassment. By allowing them to call on each other in a way that their identity is kept secret, and their subsequent communication remains undisclosed, there is a better chance for an outreach to take place. As the two communicating parties develop mutual comfort, they can gradually expose themselves one to the other, and eventually not even need the untraceable communication protocol. Many fruitful productive get-togethers may occur if the contact can be done as discreetly as described herein.

What is claimed is:

1. A method of enabling members of a community, C, to perform bilateral and multi-lateral communications within the community C without disclosing: (i) the content of any message, (ii) the pattern of communications between any two or more members of the community C, and (iii) the fact that a certain member of the community C has participated in communications with a specific other member or specific other members of the community C, the method comprising:

by a computing device:
utilizing a camouflage cipher, CC, that discards meaningless bits in a bit flow, the bit flow also containing ciphertext bits for an intended recipient, decrypting only the ciphertext bits intended for the recipient that are found in the bit flow;

regarding two members of C, i and j, who share a cipher key $k_{ij}$ utilized by the camouflage cipher CC:
  (a) member i of C, prepares a message $m_{ij}$ for member j of C,
  (b) member i of C using CC encrypts $m_{ij}$ to $m^*_{ij}$ using $k_{ij}$,
  (c) member i of C using CC concatenates upfront noise (a stream of randomized bits) $N_u$ and backside noise (a stream of randomized bits) $N_b$ to $m^*_{ij}$, creating a bit string $S_{ij}$:

$$S_{ij}=N_u-m^*_{ij}-N_b,$$

(d) member i of C submits $S_{ij}$ to an untraceable communications website (UCW), where $S_{ij}$ is added to other messages uploaded by other members of C,
  (e) member j of C downloads $S_{ij}$,
  (f) using the CC member j of C removes $N_u$ and $N_b$ from $S_{ij}$,
  (g) member j of C decrypts $m^*_{ij}$ using $k_{ij}$ and reads $m_{ij}$.

2. The method of claim 1, the method further comprising:
where member i uses key $k_{ij}$ to encrypt message $m_{ij}$ to $m^*_{ij}$ for member j of C, who has a copy of $k_{ij}$, and also encrypts a different message $m_{ik}$ to $m^*_{ik}$ for member k of C using key $k_{ik}$, key $k_{ik}$ also being held by member k of C;
the two encrypted messages $m^*_{ij}$, and $m^*_{ik}$ are concatenated with noise (a stream of randomized bits) strings $N_1$, $N_2$, $N_3$ to construct a combined string $S_{ijk}$ as follows:

$$S_{ijk}=N_1-m^*_{ij}-N_2-m^*_{ik}-N_3$$

then member i of C uploads $S_{ijk}$ to the UCW;
member j of C downloads $S_{ijk}$ from UCW, discards all the bits except $m^*_{ij}$, then decrypts $m^*_{ij}$ to $m_{ij}$,
member k of C downloads $S_{ijk}$ from UCW, discards all the bits except $m^*_{ik}$, then decrypts $m^*_{ik}$ to $m_{ik}$.

3. A method of establishing a chain of trust agents that are used by individuals to claim personal attributes without revealing their identity; the method comprising:
  (i) an individual person, P, associated with n personal attributes: $A_0=\{a_1, a_2, \ldots a_n\}$;
  (ii) a first trust-agent, $TA_1$;
  (iii) additional t−1 trust agents $TA_2, \ldots TA_t$;
  (iv) An entity Q for which P wishes to prove their association with attributes $a_1, a_2, \ldots a_i$ for $i=1, 2, \ldots n$, without revealing their identity, $I_p$;
the method further comprising the following steps:
1'. P presents $I_p$ and A before $TA_1$;
2'. $TA_1$ verifies P via $I_p$, and verifies A as associated with P;
3'. $TA_1$ activates a "Decoy Procedure" defined as follows:
  3'.1 The activating trust agent, TA, defines an entry bit string, x, comprising $I_p$ and $A^*$: $x=\{I_p, A^*\}$ where $A^*=A$ or $A^* \in A$,
  3'.2 The activating trust agent uses a random number generator, RNG, to build a corresponding exit bit string x':

$$x'=TA(x,RNG)$$

wherein the values of $A^*$ remains unchanged, but $I_p$ is replaced with a string $H_1$: $x'=\{H_1, A^*\}$,
  3'.3 The activating trust agent, TA, keeps a record to document the match $x \leftrightarrow x'$,
  3'.4 The activating trust agent, TA, transmits to the submitter of x the bit string x';
4'. P receives the output from the Decoy Procedure, $x'_0=x_1$ from $TA_1$; where $x_0=\{I_p, A\}$, and where $x_1=\{H_1, A\}$, where $H_1$ is a randomized match for $I_p$;

5'. P selects an arbitrary subset $A_1$ of A, $A_1 \in A$, and modifies string $x_1$ as follows: $x_1=\{H_1, A_1\}$;
6'. P submits $x_1$ to trust agent $TA_2$;
7'. Trust agent $TA_2$ activates the Decoy Procedure, and thereby generates output string $x_2$:

$$x_2=TA_2(x_1,RNG)$$

and where:

$$x_2=\{H_2,A_1\};$$

and where P selects an arbitrary subset $A_2$ of $A_1$, $A_2 \in A_1$, and modifies string $x_2$ as follows:

$$x_2=\{H_1,A_2\};$$

8'. where for $j=1, 2, \ldots t-1$:
  8'.1 P modifies $x_j$ from $x_j=\{H_j, A_{j-1}\}$ to $x_j=\{H_j, A_j\}$ where $A_j \in A_{j-1}$,
  8'.2 P submits $x_j$ to $TA_{j+1}$,
  8'.3 $TA_{j+1}$ activates the Decoy procedure and generates $x'_j=\{H_j, A_{j-1}\}$ $x_{j-1}$ $x_{j+1}=\{H_{j+1}, A_j\}$,
  8'.4 P modifies $x_{j+1}$ from $x_{j+1}=\{H_{j+1}, A_j\}$ to $x_{j+1}=\{H_{j+1}, A_{j+1}\}$ where $A_{j+1} \in A_j$;
9'. P submits $x_j$ to Q, for $j=1, 2, \ldots t$;
10'. Q accepts that P is associated with the set of personal attributes $A_j$.

4. The method of claim 3, the method further comprising:
wherein each attribute $a_i$ for $i=1, 2, \ldots n$, in $A_j$ for $j=1, 2, \ldots t$ is individually signed together with $H_{j+1}$, and the set of these signatures, $\Omega_{j+1}$ is made part of the output string $x_{j+1}$:

$$x_{j+1}=\{H_{j+1},A_j\}\Omega_{j+1}$$

where $\Omega_{j+1}$ is signed with the private key of $TA_{j+1}$, and $x_{j+1}$ is verified via the corresponding public key of $TA_{j+1}$.

5. The method of claim 4, the method further comprising:
where together with $x_{j-1}$, P forwards to trust agent $TA_j$ an identity proof data pack;
the identity proof data pack is constructed as follows: P selects an arbitrary one-way algorithm $L_j$, and a pair of private and public keys $U_j$, $W_j$ respectively; where to compute $U_j \rightarrow W_j$ is easy (arbitrarily few number of computational steps) but to compute $W_j \rightarrow U_j$ is intractable (arbitrarily large number of computational steps);
P forwards to $TA_j$ the identity of $L_j$ and the value of $W_j$ as the identity proof data pack: $\{L_j, W_j\}$:

$$x^*_{j-1}=x_{j-1}-\{L_j,W_j\}=TA_{j-1}\{H_{j-1},A_{j-2}\}-\{L_j,W_j\}$$

$TA_j$ constructs its output string $x_j=\{H_j, A_{j-1}\}\Omega_j-\{L_j, W_j\}$,
$TA_j$ signs $x_j$ with $\Omega^*_j$: $x^*_j=\{\{H_j, A_{j-1}\}\Omega_j-\{L_j, W_j\}\}$,
where $\Omega_j$ is constructed with the private key of $TA_j$, and is verified with the corresponding public key;
P submits $x^*_j$ to Q, Q checks $x^*_j$ via the signature $\Omega_j$, and then requests from P the value of $U_j$;
upon receipt of $U_j$, Q computes $U_j \rightarrow W'_j$ using $L_j$, if $W_j=W'_j$, then Q is persuaded that the presenter of $x^*_i$ is indeed P;
the combination of L, U, W is changed from one trust agent to the next trust agent or remains the same:

$$L_k=L_j; U_k=U_j; W_k=W_j$$

for $k,j=1, 2, \ldots t$.

6. The method of claim 5, the method further comprising:
wherein P constructs the identity proof data pack by arbitrarily selecting an arbitrary number, r, of pairs of public/private keys, all of which are chosen over the same one-way algorithm:

$$X_{j-1} = x_{j-1} - L_j - \{W_{j1}, W_{j2}, \ldots W_{jr}\} = TA_{j-1}\{H_{j-1}, A_{i-2}\} - L_j - \{W_{j1}, W_{j2}, \ldots W_{jr}\}$$

or are chosen over different one-way algorithms:

$$X_{j-1} = x_{j-1} - L_j - \{W_{j1}, W_{j2}, L_{j2} \ldots W_{jr}, L_{jr}\} = TA_{j-1}\{H_{j-1}, A_{i-2}\} - L_j - \{W_{j1}, L_{j1}, W_{j2}, L_{j2}, \ldots W_{jr}, L_{jr}\};$$

P, keeps secret the corresponding r private keys: $U_1, U_2, \ldots U_r$;

Q randomly selects a public key $W_k$, and requests P to forward the corresponding private key, $U_k$ (k=1, 2, ... r);

P, does so then Q verifies that the computed $U_k \rightarrow W'_k = W_k$ as listed in $x^*_i$;

if there is a match then Q concludes that the person presenting themselves as P is indeed who they say they are.

7. The method of claim 3, the method further comprising:
where $x_j$ is written on a physical card, C, which also carries a data signature, P-bio, of biological attributes of P, and where Q measures the corresponding biological attribute of the person, P' who submits C to Q, then computes the respective data signature, P'-bio, then Q compares P-bio to P'-bio, and if the comparison is affirmative then Q concludes that P'=P.

8. The method of claim 7, the method further comprising:
where the biological attributes are one or more of the following: fingerprint, iris, and palm structure.

9. The method of claim 7, the method further comprising:
where the biological attribute is a facial photograph which is compared to the facial appearance of P'.

10. The method of claim 3, the method further comprising:
where the trust agents are regulated by the prevailing authorities, further where upon a court-order each trust agent reveals to the authorities the input data that is linked to any of the trust agents's outputs.

* * * * *